(12) United States Patent
Dewald et al.

(10) Patent No.: US 9,382,451 B2
(45) Date of Patent: Jul. 5, 2016

(54) SUBSTRATE AND RUBBER COMPOSITION AND METHOD OF MAKING THE COMPOSITION

(75) Inventors: Richard E. Dewald, Clinton, MI (US); Suky Singh, Ann Arbor, MI (US)

(73) Assignee: Federal-Mogul Corporation, Southfield, MI (US)

(*) Notice: Subject to any disclaimer, the term of this patent is extended or adjusted under 35 U.S.C. 154(b) by 981 days.

(21) Appl. No.: 13/461,009

(22) Filed: May 1, 2012

(65) Prior Publication Data

US 2012/0237781 A1 Sep. 20, 2012

Related U.S. Application Data

(62) Division of application No. 12/571,083, filed on Sep. 30, 2009, now Pat. No. 8,182,646.

(51) Int. Cl.
*B32B 27/08* (2006.01)
*C09J 5/02* (2006.01)
*B32B 7/12* (2006.01)
*B32B 15/06* (2006.01)
*B32B 15/08* (2006.01)

(52) U.S. Cl.
CPC ... *C09J 5/02* (2013.01); *B32B 7/12* (2013.01); *B32B 15/06* (2013.01); *B32B 15/08* (2013.01); *C09J 2205/306* (2013.01); *Y10T 156/137* (2015.01); *Y10T 156/1335* (2015.01); *Y10T 156/1339* (2015.01); *Y10T 156/1343* (2015.01); *Y10T 156/1348* (2015.01); *Y10T 156/1352* (2015.01); *Y10T 156/1357* (2015.01); *Y10T 156/1361* (2015.01); *Y10T 156/1365* (2015.01); *Y10T 428/3154* (2015.04); *Y10T 428/31522* (2015.04); *Y10T 428/31598* (2015.04); *Y10T 428/31663* (2015.04)

(58) Field of Classification Search
CPC ............ B32B 7/12; B32B 15/08; B32B 37/12
USPC .................. 156/329; 428/447; 556/404, 406, 556/431–434, 464
See application file for complete search history.

(56) References Cited

U.S. PATENT DOCUMENTS

| | | | |
|---|---|---|---|
| 3,772,122 A | 11/1973 | Young | |
| 4,546,018 A | 10/1985 | Ryuzo et al. | |
| 5,102,967 A | 4/1992 | Meder | |
| 5,182,174 A | 1/1993 | Stephenson | |
| 5,230,962 A | 7/1993 | Stephenson | |
| 5,246,782 A * | 9/1993 | Kennedy | C08J 5/04 428/421 |
| 5,250,605 A | 10/1993 | Hazan et al. | |
| 5,322,870 A | 6/1994 | Lin | |
| 5,859,154 A | 1/1999 | Temple et al. | |
| 5,882,466 A * | 3/1999 | Grootaert et al. | 156/329 |
| 5,883,200 A | 3/1999 | Tsuchiya et al. | |
| 6,232,431 B1 * | 5/2001 | Hosoki | C08F 283/006 528/196 |
| 6,458,874 B1 | 10/2002 | Newton | |
| 6,475,621 B1 | 11/2002 | Kohli et al. | |
| 6,602,379 B2 | 8/2003 | Li | |
| 6,641,923 B2 * | 11/2003 | Sadvary et al. | 428/447 |
| 2003/0066603 A1 * | 4/2003 | Halladay et al. | 156/329 |
| 2005/0009982 A1 | 1/2005 | Inagaki et al. | |
| 2006/0009577 A1 | 1/2006 | Hara | |
| 2006/0246017 A1 | 11/2006 | Klee et al. | |
| 2008/0249271 A1 | 10/2008 | Beppu et al. | |
| 2008/0268259 A1 | 10/2008 | Schmatloch et al. | |

FOREIGN PATENT DOCUMENTS

| | | |
|---|---|---|
| JP | 2002347123 A | 12/2002 |
| WO | 2009104505 A1 | 8/2009 |

* cited by examiner

*Primary Examiner* — Christina Johnson
*Assistant Examiner* — Xue Liu
(74) *Attorney, Agent, or Firm* — Robert L. Stearns; Dickinson Wright, PLLC

(57) ABSTRACT

This invention provides a product comprised of a substrate with a rubber composition attached to the substrate by at least one interlayer of a polysilsesquioxane composition having phosphate cross-linkages. The at least one polysilsesquioxane layer having phosphate cross-linkages is produced from a mixture of a silane coupling agent and a phosphatizing reagent.

12 Claims, No Drawings

SUBSTRATE AND RUBBER COMPOSITION AND METHOD OF MAKING THE COMPOSITION

This divisional application claims priority to U.S. application Ser. No. 12/571,083, filed Sep. 30, 2009 now U.S. Pat. No. 8,182,646, and is incorporated herein by reference.

FIELD OF THE INVENTION

This invention relates to a method for attaching a rubber composition to a substrate. The invention also relates to a product produced by the method in which the product is comprised of a substrate attached to a rubber composition by at least one polysilsesquioxane layer having phosphate cross-linkages.

BACKGROUND OF THE INVENTION

Products or compositions that are comprised of a substrate and a rubber composition attached to the substrate are used for any number of applications. In applications in which there are extreme environmental conditions such as high temperatures, high pressures, and high stress situations, the substrate and rubber composition not only have to stand up to the extreme conditions to avoid corrosion or erosion, the substrate and rubber composition should have high reliability in staying attached to one another.

In particular applications such as seals, the substrate is generally treated to either aid in environmental resistance to the substrate, aid in attaching the rubber composition to the substrate or both. Such treatments have included treatment with zinc phosphate, iron phosphate, manganese phosphate, or a similar-type metal composition.

U.S. Pat. No. 7,354,658 discloses a metal substrate in which a rubber is adhered to a portion of the substrate surface. In order to improve the adhesive property between the metal and the rubber, the surface is roughened. The substrate is then treated using a zinc phosphate treatment, and a rubber composition is then attached to produce a seal as a final product.

U.S. Pat. No. 7,384,028 discloses a rubber part having a metal fitting in which the metal fitting and the rubber part are integrated through an anti-corrosion chemical film formed on a surface of the metal fitting. The anti-corrosion chemical film is a zirconium-based chemical film that is stated to be harmless to the human body as well as to the environment. The rubber and metal fitting is produced by degreasing an outer peripheral surface of the metal fitting, subjecting the surface to shot blasting treatment, degreasing the treated surface, and water washing the treated surface; forming a zirconium-based chemical film on the treated surface; water washing and drying an outer peripheral surface of the zirconium-based chemical film; forming an adhesive layer on the outer peripheral surface of the zirconium-based chemical film; and integrating the rubber part on the outer peripheral surface of the adhesive layer.

Additional methods of producing products comprised of substrate and rubber components are desired. It is particularly desired to find new methods to produce products that are better able to withstand extreme environmental operating conditions. Also desirable are new methods that reduce or eliminate the use of metal treatment steps that result in having to dispose of excess metals used during manufacture. It is further desired to find new methods that reduce or simplify the steps of the manufacturing process.

SUMMARY OF THE INVENTION

This invention provides a product comprised of a substrate and rubber composition attached to the substrate in which the product and its components are able to withstand extreme environmental conditions. The product is produced using methods that significantly reduce or eliminate the use of metal treatment steps that result in having to dispose of excess metals used during the process. The processes used to produce the product also reduce or simplify the steps of previously used manufacturing processes.

According to one aspect of the invention, there is provided a method for attaching a rubber composition to a substrate. The method includes preparing or obtaining a mixture of a silane coupling agent and a phosphatizing reagent. A surface of the substrate is treated with the mixture, and the rubber composition is attached to the treated surface of the substrate.

According to another aspect of the invention, there is provided a product or composition comprised of a substrate attached to a rubber composition by at least one polysilsesquioxane layer having phosphate cross-linkages. The at least one polysilsesquioxane layer having phosphate cross-linkages is produced from the mixture of a silane coupling agent and a phosphatizing reagent.

Preferably, the silane coupling agent is at least one silane selected from the group consisting of amino-silanes, mercapto-silanes, epoxy_silanes, carboxy-silanes, vinyl-silanes, and halogen-containing silanes.

In one embodiment of the invention, the mixture that is prepared to apply to the substrate further comprises at least one phenolic resin.

In another embodiment, the silane coupling agent is at least one silane selected from the group consisting of amino-silanes and vinyl silanes. In this embodiment, it is preferred that the mixture is prepared without adding phenolic resin.

In yet another embodiment of the invention, the phosphatizing reagent is at least one phosphoric acid compound or phosphonic acid compound.

In another embodiment, the rubber composition is a diene-series rubber, an olefinic rubber, an acrylic rubber, a fluorine-containing rubber, a silicone-series rubber, a urethane-series rubber, an epichlorohydrin rubber, a chlorosulfonated polyethylene, a propylene oxide rubber, an ethylene-vinyl acetate copolymer, a polynorbornene rubber, or a modified rubber thereof.

The substrate is preferably a metal, a ceramic compound having a metal surface, or a thermoplastic polymer having a metal surface. More preferably, the substrate is a metal.

DETAILED DESCRIPTION OF THE INVENTION

This invention provides a composition comprised of a substrate with a rubber composition attached to the substrate by at least one interlayer of a polysilsesquioxane composition having phosphate cross-linkages. The composition is extremely durable in extreme environments such as high temperature, high pressure, and high stress conditions. The polysilsesquioxane layer or composition can be applied to the substrate using an environmentally friendly process in that the use of undesirable metal pretreatment steps are not required in making the composition.

The polysilsesquioxane composition having phosphate cross-linkages is produced by applying or treating a mixture of a silane coupling agent and a phosphatizing reagent to a surface of the substrate. The mixture itself is produced by mixing together an amount of the silane coupling agent and phosphatizing reagent effective for forming a polysilsesquioxane composition having phosphate cross-linkages to the substrate surface.

In one embodiment, the mixture is formed by the addition of from 0.1 wt % to 20 wt % of the silane coupling agent, based on total weight of the mixture, to a vessel or container that is used to hold or mix together the components in the mixture. Preferably, the mixture is formed from the addition of from 0.2 wt % to 15 wt %, more preferably from 0.5 wt % to 10 wt % of the silane coupling agent, based on total weight of the mixture.

The silane coupling agent can be any silane composition capable of forming polysilsesquioxane. Examples of useful silane coupling agents include amino-silanes, mercapto-silanes, epoxy_silanes, carboxy-silanes, vinyl-silanes, and halogen-containing silanes.

Examples of amino-silanes include, but are not limited to, gamma-aminopropyltrimethoxysilane, gamma-aminopropyltriethoxysilane, gamma-aminopropylmethyldimethoxysilane, gamma-aminopropylmethyldiethoxysilane, gamma-(2-aminoethyl) aminopropyltrimethoxysilane, gamma-(2-aminoethyl) aminopropylmethyldimethoxysilane, gamma-(2-aminoethyl) aminopropyltriethoxysilane, gamma-(2-aminoethyl) aminopropylmethyldiethoxysilane, .gamma.-ureidepropyltrimethoxysilane, N-phenyl-gamma-aminopropyltrimethoxysilane, N-benzyl-gamma-aminopropyltrimethoxysilane and N-vinylbenzyl-gamma-aminopropyltriethoxysilane.

Examples of mercapto-silanes include, but are not limited to, gamma-mercaptopropyltrimethoxysilane, gamma-mercaptopropyltriethoxysilane, gamma-mercaptopropylmethyldimethoxysilane and gamma-mercaptopropylmethyldiethoxysilane.

Examples of epoxy-silanes include but are not limited to gamma-glycidoxypropyltrimethoxysilane, gamma-glycidoxypropyltriethoxysilane, gamma-glycidoxypropylmethyldimethoxysilane, beta-(3,4-epoxycyclohexyl)ethyltrimethoxysilane and beta-(3,4-epoxycyclohexyl) ethyltriethoxysilane.

Examples of carboxy-silanes include, but are not limited to, beta-carboxyethyltriethoxysilane, beta-carboxyethylphenylbis(2-methoxyethoxy)silane and N-beta-(carboxymethyl)aminoethyl-gamma-aminopropyltrimethoxysilane.

Examples of vinyl-silanes include, but are not limited to, vinyltrimethoxysilane, vinyltriethoxysilane, gamma-methacryloyloxypropylmethyldimethoxysilane and gamma-acryloyloxypropylmethyltriethoxysilane.

An example of a halogen-containing silane includes, but is not limited to, gamma-chloropropyltrimethoxysilane.

In one embodiment of the invention, the mixture is formed from the addition of from 1 wt % to 20 wt % of the phosphatizing reagent, based on total weight of the mixture. Preferably, the mixture is formed from the addition of from 2 wt % to 15 wt %, more preferably from 3 wt % to 10 wt % of the phosphatizing reagent, based on total weight of the mixture.

The phosphatizing reagent can be any phosphorus-containing acid that is effective for crosslinking with polysilsesquioxane. Any suitable phosphoric acid compound or phosphonic acid compound is preferred.

Preferred phosphoric acid compounds include phosphoric acid compounds of the general formula:

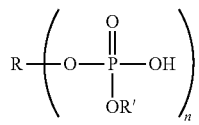

wherein R and R', which can be the same or different, are H, alkyl of 1 to 30 carbons and aryl of 6 to 30 carbons, n is an integer of from 1 to 6; including +1 and +2 metal salts of the phosphoric acid compounds.

Examples of phosphoric acids and their salts include, but are not limited to, phosphoric acid (mono-alkyl and di-alkyl phosphoric acid, with alkyl having 1 to 10 carbons), mono-n-dodecyl phosphate, tridecyl acid phosphate, oleyl acid phosphate, octadecyl acid phosphate, di-n-amyl phosphate, distearyl phosphate, n-butyldihydrogen phosphate, calcium dihydrogen phosphate, aluminum dihydrogen phosphate, D-myo-inositol 1,4-biphosphate, potassium salt, (R,S)-(+,−)-1,1'-binaphthyl-2,2'- diylhydrogenphosphate, D-myo-inositol triphosphate, potassium salt, D-myo-inositol, 1,3,4,5-tetraphosphate, D-myo-inositol pentaphosphate, barium salt, inositol hexaphosphoric acid (phytic acid), sodium phytate, phenyl phosphoric acid, and di-phenyl phosphoric acid.

Preferred phosphonic acid compounds include phosphonic acid compounds of the general formula:

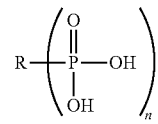

wherein R is alkyl of 1 to 30 carbons and aryl of 6 to 30 carbons, n is an integer of from 1 to 6; including +1 and +2 metal salts of the phosphonic acids.

Examples of phosphonic acids and their salts include, but are not limited to, phosphonic acid (mono-alkyl and di-alkyl phosphonic acid, with alkyl having 1 to 10 carbons), n-dodecylphosphonic acid, ethylphosphonic acid, phenyl phosphonic acid, di-phenyl phosphonic acid, n-hexylphosphonic acid, n-butylphosphonic acid, n-decylphosphonic acid, n-undecylphosphonic acid, n-tridecylphosphonic acid, n-tetradecylphosphonic acid, n-pentadecylphosphonic acid, propylene diphosphonic acid, N,N-bis(phosphonomethyl)glycine, 1,2-ethylenediphosphonic acid, methylenediphosphonic acid, 1,1-ethylidenediphosphonic acid, dimethylmethylenediphosphonic acid, nitrilotris(methylene)triphosphonic acid, ethylenediaminetetra(methylenetriphosphonic acid), hexamethylenediaminetetra(methylenetriphosphonic acid), diethylenetriaminepenta(methylenetriphosphonic acid), inositolhexaphosphonic acid, and calcium, magnesium inositolhexaphosphate salt.

In one embodiment of the invention, the mixture of phosphatizing reagent and silane coupling agent further comprises the addition of at least one phenolic resin. The phenolic resin can be a resol resin, a novolac resin, or a combination thereof.

In one embodiment, the mixture is formed from the addition of from 1 wt % to 40 wt % phenolic resin, based on total weight of the mixture. Preferably, is formed from the addition of from 5 wt % to 40 wt %, more preferably from 20 wt % to 40 wt %, of the phenolic resin, based on total weight of the mixture.

In general, resol resins are produced by reacting a phenol compound with a stoichiometric excess of an aldehyde compound in the presence of an alkaline catalyst. Novolac resins are generally produced by reacting an aldehyde compound with a stoichiometric excess of a phenol compound in the presence of an acid catalyst.

Phenol compounds used in the production of the phenolic resins used in this invention include, but are not limited to, monophenols (e.g. phenol, trimethylphenol, ethylphenol, m-propylphenol, butylphenol, m-sec-butylphenol, m-isobutylphenol, m-tert-butylphenol, m-bromophenol, m-chlorophenol, m-phenylphenol, m-benzylphenol, octylphenol, m-cetylphenol, m-cumylphenol, m-hydroxyacetophenol, m-hydroxybenzophenone, m-d-limonenephenol, o-cresol, m-cresol, p-cresol, 2,3-xylenol, 2,4-xylenol, 2,5-xylenol, 2,6-xylenol, 3,4-xylenol, 3,5-xylenol, etc.) and biphenols (e.g. catechol, resorcinol, hydroquinone, bisphenol A, etc.).

Aldehyde compounds used in the production of the phenolic resins used in this invention include, but are not limited to, formaldehyde and modified forms thereof, e.g., not less than 37% formalin, paraldehyde, acetaldehyde, propionaldehyde and isobutylaldehyde, and isopentylaldehyde. Formaldehyde is a preferred example. Formaldehyde can be used as an aqueous solution (not less than 37 weight %) or in the form of a low molecular weight polymer such as paraformaldehyde or trioxane. Other non-limiting examples of the aldehyde include furfural, 2-ethylhexanal, ethylbutylaldehyde, heptaldehyde, benzaldehyde and crotonaldehyde.

In a particular embodiment of the invention, the mixture is formed from at least one phosphatizing reagent and at least one silane coupling agent selected from the group consisting of amino-silanes and vinyl-silanes. Preferably, in one embodiment, the mixture is formed from at least one phosphatizing reagent and at least one silane coupling agent selected from the group consisting of amino-silanes and vinyl-silanes, without adding phenolic resin to produce the mixture.

Substrates that can be used according to this invention include any appropriate substrate in which the substrate can be treated with the mixture used in this invention and to which a rubber composition can then be attached. A metal, a ceramic compound, or a thermoplastic polymer can be used as the substrate. In one embodiment, the substrate is a metal, a ceramic compound having a metal surface, or a thermoplastic polymer having a metal surface. Examples of metals that can be used in this invention include, but are not limited to, carbon steel, stainless steel, aluminum, aluminum alloy, titanium, titanium alloy, magnesium, magnesium alloy, and metal coated with one or more different metallic or organic layers.

According to one aspect of the invention, the substrate is treated with the mixture of this invention. In one embodiment, the substrate is treated with the mixture at a temperature of not greater than 150° F. (66° C.). Preferably, the substrate is treated with the mixture at a temperature of from 40° F. (4° C.) to 150° F. (66° C.), more preferably from 50° F. (4° C.) to 120° F. (49° C.), and most preferably from 60° F. (16° C.) to 100° F. (38° C.).

Following treatment of the substrate, the treated substrate is dried. Preferably, the substrate is dried at a temperature of from 158° F. (70° C.) to 248° F. (120° C.), more preferably from 176° F. (80° C.) to 230° F. (110° C.), and most preferably from 194° F. (90° C.) to 221° F. (105° C.)

The rubber composition that is attached to the treated substrate used in this invention can be cured or uncured, wherein cured rubber is preferred. Examples of curing processes include, but are not limited to, soap, sulfur (e.g., vulcanization), diamine, onium salts, peroxide and bisphenol.

Examples of types of rubber that can be used according to this invention include, but are not limited to, a diene-series rubber, an olefinic rubber, an acrylic rubber, a fluorine-containing rubber, a silicone-series rubber (e.g., a silicone rubber), a urethane-series rubber, an epichlorohydrin rubber (e.g., a homopolymer of epichlorohydrin (CO), a copolymer of epichlorohydrin and ethylene oxide (ECO), and a copolymer further copolymerized with allyl glycidyl ether), a chlorosulfonated polyethylene, a propylene oxide rubber (GPO), an ethylene-vinyl acetate copolymer (EAM), a polynorbornene rubber, and a modified rubber thereof (e.g., an acid-introduced (or acid-modified) rubber). These rubbers may be used singly or in combination.

Examples of diene-series rubber include, but are not limited to, natural rubber (NR); polymers of diene-series monomers, such as an isoprene rubber (IR), isobutylene-isoprene rubber (butyl rubber) (IIR), butadiene rubber (BR), chloroprene rubber (CR); acrylonitrile-diene copolymerized rubber such as an acrylonitrile-butadiene rubber (nitrile rubber) (NBR), nitrile-chloroprene rubber (NCR), nitrile-isoprene rubber (NIR), or acrylonitrile-isoprene-butadiene rubber (NBIR); styrene-diene copolymerized rubber such as a styrene-butadiene rubber (SBR, for example, random copolymers of styrene and butadiene, a SB-block copolymer comprised of styrene blocks and butadiene blocks), styrene-chloroprene rubber (SCR), and styrene-isoprene rubber (SIR).

Diene-series rubber can further include hydrogenated rubber, for example, hydrogenated nitrile rubber (HNBR). A proportion of a styrenic component in styrene-diene copolymerized rubbers can be from about 10 to 80 mol %, preferably about 20 to 70 mol % and more preferably about 30 to 60 mol % in terms of the monomers making up the copolymer.

Examples of olefinic rubber include, but are not limited to, ethylene-propylene rubber (EPM), and ethylene-propylene-diene rubber (EPDM).

Examples of acrylic rubber include rubber comprised of alkyl acrylate as a main component, such as a copolymer of an alkyl acrylate and a chlorine-containing crosslinkable monomer (ACM), a copolymer of an alkyl acrylate and acrylonitrile (ANM), a copolymer of an alkyl acrylate and a carboxyl group- and/or epoxy group-containing monomer, and an ethylene-acrylic rubber.

Examples of fluorine-containing rubber include, but are not limited to, rubber obtained by using a fluorine-containing monomer, for example, a copolymer of vinylidene fluoride and perfluoropropene, and optionally, tetrafluoroethylene (FKM); a copolymer of tetrafluoroethylene and propylene; a copolymer of tetrafluoroethylene and perfluoromethyl vinyl ether (FFKM).

Silicone-series rubber (Q) refers to an organopolysiloxane comprising units represented by the formula $R_aSiO_{(4-a)2}$, wherein R represents $C_{1-10}$ alkyl such as methyl, ethyl, propyl or butyl; halogenated $C_{1-10}$ alkyl such as 3-chloropropyl or 3,3,3-trifluoropropyl group; $C_{2-10}$ alkenyl such as vinyl, allyl or butenyl; $C_{6-12}$ aryl such as phenyl, tolyl or naphthyl; $C_{3-10}$ cycloalkyl such as cyclopentyl or cyclohexyl; $C_{6-12}$ aryl-$C_{1-4}$ alkyl such as benzyl or phenethyl, and "a" is from about 1.9 to about 2.1. Preferably, R is methyl, phenyl, alkenyl (e.g., vinyl group), or fluoro $C_{1-6}$ alkyl.

The silicone-series rubber (Q) includes, for example, a methylsilicone rubber (MQ), a vinylsilicone rubber (VMQ), a phenylsilicone rubber (PMQ), a phenylvinylsilicone rubber (PVMQ), a fluorosilicone rubber (FVMQ), and the like. Further, such a silicone-series rubber includes not only a solid rubber of the High Temperature Vulcanizable (HTV) silicone rubber but also a Room Temperature Vulcanizable (RTV) silicone rubber or Low Temperature Vulcanizable (LTV) silicone rubber, for example a liquid or. paste-like rubber.

Examples of urethane rubber (U) include, but are not limited to polyester-based urethane elastomers, and polyether-based urethane elastomers.

Modified rubbers can also be used. Examples include, but are not limited to, acid-modified rubbers such as carboxyl- or acid anhydride-containing rubber, e.g., a carboxylic styrene-butadiene rubber (X-SBR), a carboxylic nitrile rubber (X-NBR), and a carboxylic ethylene-propylene rubber (X-EP(D)M).

Any method or technique suitable for attaching the rubber composition to the treated substrate can be used. Examples of suitable attachment methods include, but are not limited to, molding, compression molding, injection-transfer molding, transfer molding, as well as any molding process that allows the substrate to be held in place in the mold during the molding process, allowing the substrate to be overmolded. More specific examples of suitable molding methods or techniques are described in Baranwal, K. C. and Stephens, H. L., ed., *Basic Elastomer Technology*, The Rubber Division, American Chemical Society, Akron, 2001, pp. 132-141, the attachment techniques of which are incorporated herein by reference.

The substrate and attached rubber composition produced according to this invention can be used in any number of ways. In a preferred embodiment, the product is used as a seal. Preferably, the product is a radial or radial shaft seal. Radial shaft seals are used to seal rotary elements, such as a shaft or rotating bore. Examples include, but are not limited to, crankshaft seals, transmission output seals, strut seals, hydraulic pump seals, axle seals, power steering seals, and valve stem seals.

The principles and modes of operation of this invention have been described above with reference to various exemplary and preferred embodiments. As understood by those of skill in the art, the overall invention, as defined by the claims, encompasses other preferred embodiments not specifically enumerated herein.

The invention claimed is:

1. A composition comprised of a substrate attached to a rubber composition by at least one polysilsesquioxane layer having phosphate cross-linkages, wherein the at least one polysilsesquioxane layer having phosphate cross-linkages is produced from a mixture including 0.2 weight percent (wt %) to 15 wt % of a silane coupling agent and 1 wt % to 20 wt % of a phosphatizing reagent, based on the total weight of the mixture.

2. The composition of claim 1, wherein the substrate is a metal, a ceramic compound having a metal surface, or a thermoplastic polymer having a metal surface.

3. The composition of claim 1, wherein the substrate is a metal.

4. The composition of claim 1, wherein the rubber composition is a diene-series rubber, an olefinic rubber, an acrylic rubber, a fluorine-containing rubber, a silicone-series rubber, a urethane-series rubber, an epichlorohydrin rubber, a chlorosulfonated polyethylene, a propylene oxide rubber, an ethylene-vinyl acetate copolymer, a polynorbornene rubber, or a modified rubber thereof.

5. The composition of claim 1, wherein the silane coupling agent is at least one silane selected from the group consisting of amino-silanes, mercapto-silanes, epoxy_silanes, carboxy-silanes, vinyl-silanes, and halogen-containing silanes.

6. The composition of claim 5, wherein the mixture further comprises at least one phenolic resin.

7. The composition of claim 1, wherein the silane coupling agent is at least one silane selected from the group consisting of amino-silanes and vinyl silanes.

8. The composition of claim 7, wherein the mixture is prepared without adding phenolic resin.

9. The composition of claim 1, wherein the phosphatizing reagent is at least one phosphoric acid compound or phosphonic acid compound.

10. The composition of claim 1, wherein the composition is a seal.

11. The composition of claim 1, wherein the mixture includes 1 wt % to 40 wt % phenolic resin, based on the total weight of the mixture.

12. The composition of claim 6, wherein the mixture includes 0.5 wt % to 10 wt % of the silane coupling agent, 1 wt % to 10 wt % of the phosphatizing reagent, and 20 wt % to 40 wt % of the phenolic resin, based on the total weight of the mixture;

the phosphatizing reagent is a phosphoric acid compound or phosphonic acid compound;
the substrate is a metal;
the rubber composition is a diene-series rubber, an olefinic rubber, an acrylic rubber, a fluorine-containing rubber, a silicone-series rubber, a urethane-series rubber, an epichlorohydrin rubber, a chlorosulfonated polyethylene, a propylene oxide rubber, an ethylene-vinyl acetate copolymer, a polynorbornene rubber, or a modified rubber thereof; and
the composition including the substrate and the rubber composition is a seal.

* * * * *